(12) United States Patent
Morris et al.

(10) Patent No.: US 8,965,212 B2
(45) Date of Patent: Feb. 24, 2015

(54) OPTICAL MEMORY EXPANSION

(75) Inventors: Terrel Morris, Garland, TX (US); Michael Renne Ty Tan, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 479 days.

(21) Appl. No.: 13/262,807

(22) PCT Filed: Apr. 29, 2009

(86) PCT No.: PCT/US2009/002602
§ 371 (c)(1),
(2), (4) Date: Oct. 3, 2011

(87) PCT Pub. No.: WO2010/126463
PCT Pub. Date: Nov. 4, 2010

(65) Prior Publication Data
US 2012/0033978 A1    Feb. 9, 2012

(51) Int. Cl.
*H04B 10/00* (2013.01)
*G06F 13/40* (2006.01)

(52) U.S. Cl.
CPC .................................... *G06F 13/409* (2013.01)
USPC ........................................... 398/115; 398/139

(58) Field of Classification Search
CPC .... H04B 10/40; H04B 10/43; H04B 10/2575; H04B 10/504
USPC .......................... 398/136, 138, 139, 164, 115
See application file for complete search history.

(56) References Cited

U.S. PATENT DOCUMENTS

| | | | |
|---|---|---|---|
| 6,188,702 B1 * | 2/2001 | Tornetta et al. | 370/535 |
| 6,793,408 B2 | 9/2004 | Levy et al. | |
| 6,987,760 B2 * | 1/2006 | Calvignac et al. | 370/369 |

(Continued)

FOREIGN PATENT DOCUMENTS

| CN | 1886688 | 12/2006 |
|---|---|---|
| CN | 101076945 | 11/2007 |

(Continued)

OTHER PUBLICATIONS

English translation of Abstract from Research on Theory and Application of Fiber Optic Amplifier, Journal of Zhangzhou Vocational University, Feb. 15, 2002, vol. 1, No. 1, pp. 71-73.

(Continued)

*Primary Examiner* — Dalzid Singh

(57) ABSTRACT

Various embodiments of the present invention are directed to optical-based methods and expansion memory systems for disaggregating memory of computer systems. In one aspect, an expansion memory system comprises a first optical/electronic interface in electrical communication with a processor, a memory expansion board configured with memory, and a second optical/electronic interface attached to the memory expansion board. The first interface converts optical signals into electronic signals that are sent to the processor and converts electronic signals produced by the processor into optical signals. The second interface converts optical signals into electronic signals that are sent to the memory and converts electronic signals produced by the memory into optical signals. The optical signals are exchanged between the first and second interfaces. Embodiments also include methods for sending and receiving data in an expansion memory system.

17 Claims, 12 Drawing Sheets

(56) References Cited

U.S. PATENT DOCUMENTS

| | | | |
|---|---|---|---|
| 7,167,955 B1* | 1/2007 | Neils et al. | 711/141 |
| 7,782,778 B2* | 8/2010 | Sheth et al. | 370/235 |
| 2004/0044833 A1 | 3/2004 | Ryan | |
| 2004/0067061 A1* | 4/2004 | Jiang et al. | 398/135 |
| 2004/0126065 A1 | 7/2004 | Levy et al. | |
| 2004/0144994 A1 | 7/2004 | Lee et al. | |
| 2008/0222351 A1* | 9/2008 | Verdiell et al. | 711/104 |
| 2014/0056594 A1* | 2/2014 | Ding et al. | 398/136 |

FOREIGN PATENT DOCUMENTS

| | | |
|---|---|---|
| JP | 1999-039251 | 2/1999 |
| JP | 2000-058882 | 2/2000 |
| JP | 2003-067137 | 3/2003 |
| JP | 2005-064888 | 3/2005 |
| JP | 2006-236388 | 9/2006 |
| JP | 2007-141836 | 6/2007 |
| JP | 2008-065575 | 3/2008 |
| WO | WO-2008106626 | 9/2008 |
| WO | WO-2009/051755 | 4/2009 |

OTHER PUBLICATIONS

Research on Theory and Application of Fiber Optic Amplifier, Journal of Zhangzhou Vocational University, Feb. 15, 2002, vol. 1, No. 1, pp. 71-73 (in Chinese).

* cited by examiner

OPTICAL MEMORY EXPANSION

TECHNICAL FIELD

Embodiments of the present invention are related to computer memory, and, in particular, to systems and methods for optical disaggregation of memory.

BACKGROUND

The growing size of applications, popularity of software-based multimedia, and increasing graphics workloads have contributed to an increased demand in memory capacity. Many computer systems, such as servers, workstations, networking equipment, and high-end desktop computers, are often configured with only enough memory to support applications of the day and are not typically configured with enough memory to support applications that may be run on the same system in the future. FIG. 1 shows an isometric view of memory 102 and processor 104 components disposed on a motherboard 106 of a computer system configured to support a DDR interface. The memory 102 is composed of four dual in-line memory modules ("DIMMs") 108-111 inserted into four DIMM slots 112-115, respectively. Each DIMM includes eight dynamic random access memory ("DRAM") chips. The processor 104 is a chip that manages the flow of data sent to and from the DIMMs 108-111 and interfaces the memory 102 with other major components of the computer system. The DIMMs 108-111 are in electrical communication with the processor 104 via a DDR interface 118 which has a stub-bus topology providing a shared, parallel-path interface for sending data, address, and control information in electronic signals in parallel between the processor 104 and the data lines of every DRAM in the DIMMs 108-111.

The term "DDR" refers to transmitting data on both the rising and falling edges of the computer system clock signal. The processor 104 and the DIMMs 108-111 are configured to transmit and receive data in accordance with DDR. By using both edges of the clock, the data signals operate at the same limiting frequency, doubling the data transmission rate. There are a number of different DDR interface 118 implementations that are identified in general by DDRx, where x is a whole number. For example, DDR1 employs double-data-rate signalling on the data lines, but the address and control signals are still sent to the DIMMs once per clock cycle period. DDR2 operates at twice the speed of DDR1, which is accomplished by operating the memory cells of each DRAM at half the clock rate rather than at the clock rate as in DDR1. DDR3 provides the ability to run the input/output bus at four times the speed of the memory cells.

In order to keep pace with the ever increasing memory demands that new applications, or new application versions, place on a computer system, a computer system operator can increase the memory of the computer system by simply adding DIMMs to existing DDR memory channels and switch to a buffered memory design. However, when DIMMs are added to electrical DDR memory channels, electrical loading causes bus timing errors which persist until the bus speed is reduced. As a result, a tradeoff exists between maximum memory size and maximum memory speed. Alternatively, with buffered memory designs, power and latency are always incurred, whether or not the memory is fully loaded. Because once a few DIMMs can be loaded per buffered channel, even the buffered systems are limited in the memory that can be provisioned. In addition, each added buffer adds power consumption and cost, making this solution undesirable for high volume, low-cost systems.

Other factors to consider in simply adding DIMMs to a computer system are that conventional processors utilize two types of on-board memory controllers: 1) buffered memory and 2) direct-attached memory. A memory controller is a digital circuit that manages the flow of data to and from the DIMMs and can be implemented as a separate chip or integrated within a chip, such as a processor. Memory controllers contain the logic necessary to read and write DRAM and to refresh the DRAM by sending current through the entire device. Buffered memory systems allow a mechanism for memory expansion and always incur the cost of the buffers whether or not the memory is fully populated. On the other hand, direct-attached memory allows for low-cost implementations and uses less power than buffered memory, because direct-attached memory does not require buffer chips, but direct-attached memory is inherently limited by electrical loading effects. As a result, direct-attached memory systems are limited in the amount of memory that can be controlled and used by a single processor. Thus, in order to add more memory to a server or multi-processor system, more processors are added.

What is desired is a system that allows memory expansion and disaggregation of the memory so that DRAM memory can be increased when needed without the relatively higher cost associated with having to redesign and build a new computer system to support the increasing memory demands of the latest applications.

DETAILED DESCRIPTION

Various embodiments of the present invention are directed to optical-based methods and expansion memory systems for disaggregating memory of computer systems. In the following description, the term "optical" refers to classical and/or quantized electromagnetic radiation having wavelengths in the visible and non-visible portions of the electromagnetic spectrum. Expansion memory system embodiments include a first optical/electronic interface that is in electrical communication with a primary board or blade and in optical communication with a memory expansion board via a second optical/electronic interface. The optical/electronic interfaces can be implemented with DDRx interfaces, perform a translation to a series protocol, and convert electronic signals to optical signals for transmission between the primary board and the memory expansion board. The expansion memory system can be implemented with an optical bus to expand distribution of signaling to one or more sets of DIMMs.

System embodiments allow direct-attached memory to be provisioned with additional remotely-mounted memory capacity, increasing per-socket and per-core memory available to a processor. As a result, system embodiments mitigate latencies associated with database and other applications that place a large amount of data in memory. Memory expansion carried out in accordance with embodiments of the present invention can be accomplished without incurring cost on the motherboard by expanding the memory onto adjacent boards through separate optical interconnects. System embodiments enable memory to be placed in other physical locations on a motherboard and enable thermal, packaging, and power considerations to be optimally addressed in system designs.

Figure 1:
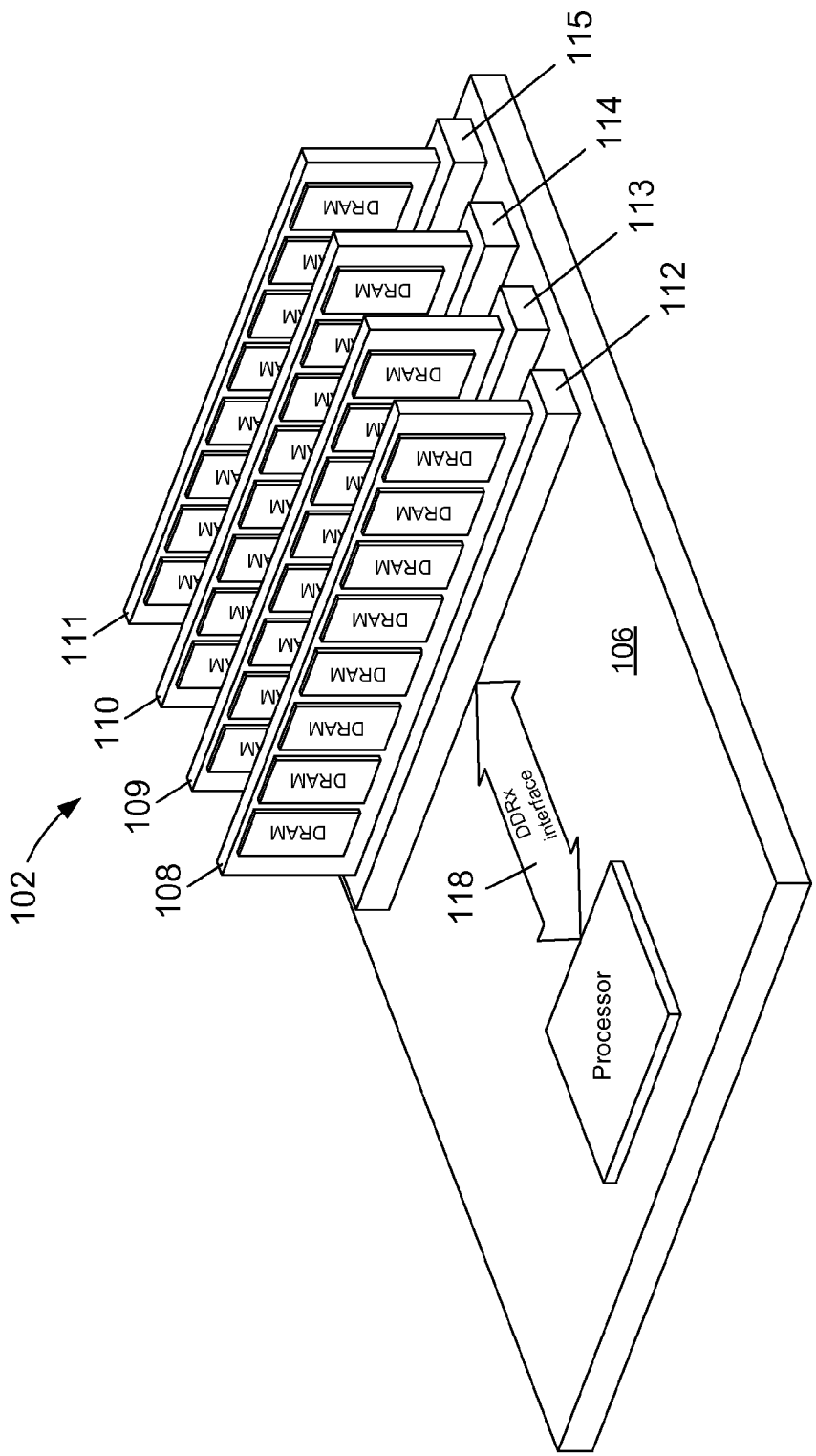
FIG. 1 shows an isometric view of memory and processor components disposed on a motherboard of a computer system configured to support a double data rate interface.
Figure 2:
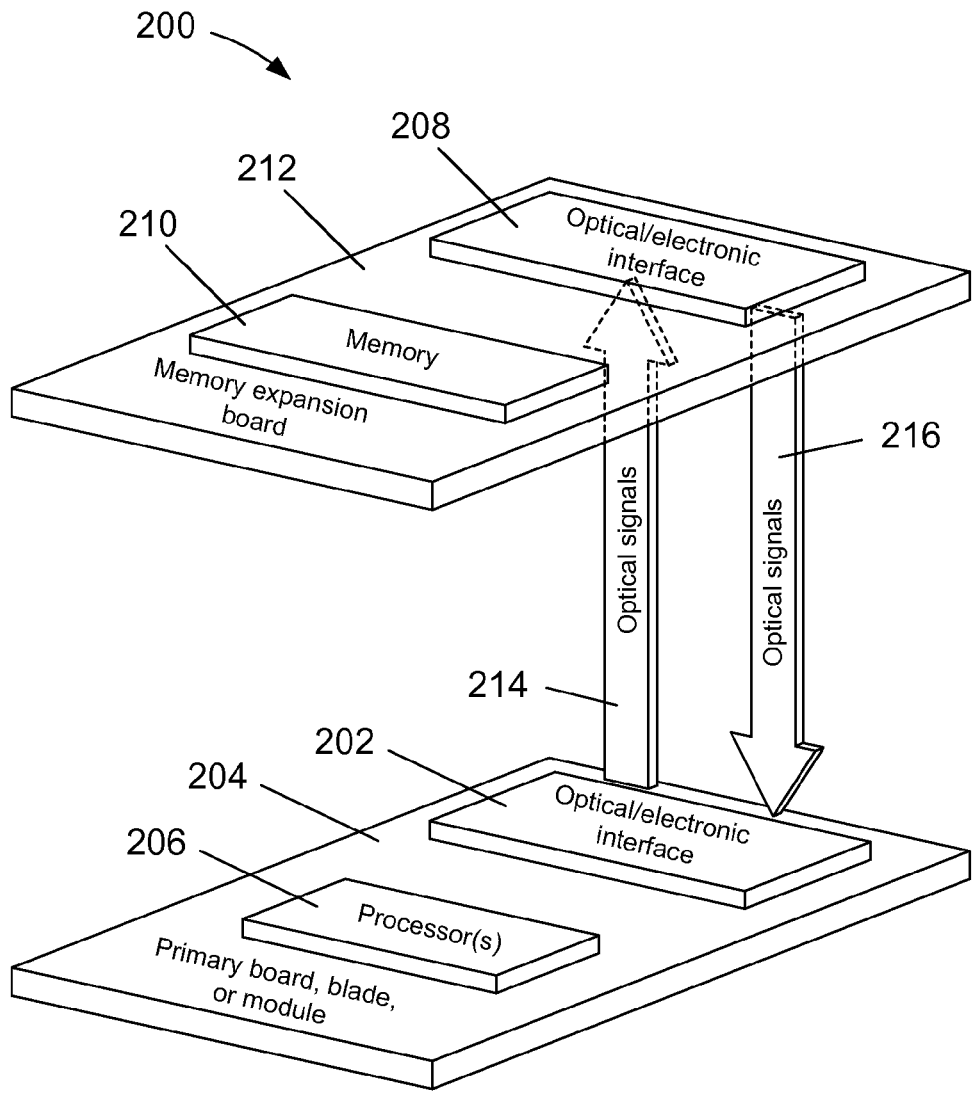
FIG. 2 shows a schematic representation of an expansion memory system configured in accordance with embodiments of the present invention.

FIG. 2 shows a schematic representation of an expansion memory system 200 configured in accordance with embodiments of the present invention. The system 200 includes a first optical/electronic interface 202 in electronic communication with components of a primary board 204, such as processor(s) 206. The primary board 204 can be a motherboard of a computer, such as a desktop computer or a workstation; a blade server (i.e., blade) of blade system; or a module. The system 200 also includes a second optical/electronic interface 208 in electronic communication with memory 210 of a memory expansion board 212. The memory 210 can be composed of one or more DIMMs in electronic communication with the second interface 208. The memory expansion board 212 can be located within the same cabinet or a different cabinet. The first interface 202 receives electronic signals encoding data, address, and control information produced by the processors 206 and converts the electronic signals into optical signals 214 that are sent to the second interface 208. The second interface 208 receives the optical signals 214 and converts the optical signals 214 back into electronic signals that are sent to and stored in memory 210. In order to retrieve data stored in memory 210, the data is encoded in electronic signals that are sent to the second interface 208, which converts the electronic signals into optical signals 216 that are sent to the first interface 202, which, in turn, converts the optical signals 216 into electronic signals that can be processed by the processors 206.

Figure 3A:
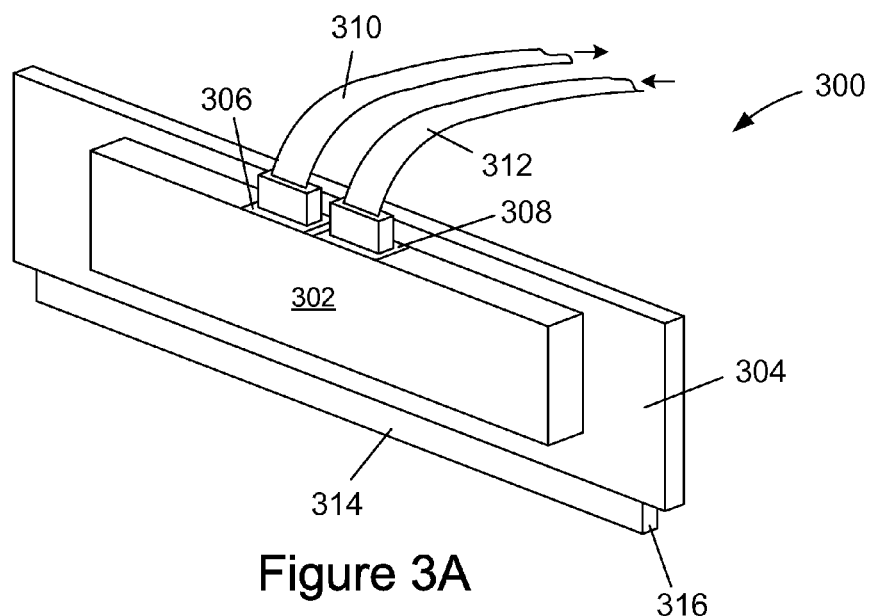
FIG. 3A shows an isometric view of an expansion DIMM configured in accordance with embodiments of the present invention.

In certain embodiments, the optical/electronic interfaces 202 and 208 can be implemented on expansion DIMMs. FIG. 3A shows an isometric view of an expansion DIMM 300 configured in accordance with embodiments of the present invention. The expansion DIMM 300 includes an expansion element 302 disposed on a substrate 304. The expansion element 302 includes an electronic interface (not shown) and an optical interface (not shown) including two optical ports 306 and 308. The electronic interface (not shown) performs parallel-to-serial and serial-to-parallel flow control of electronic signals encoding data sent to and from the expansion DIMM over a DDRx interface, as described below. FIG. 3A shows waveguides 310 and 312 inserted into the optical ports 306 and 308, respectively. The term "waveguide" refers to an optical fiber, an optical ribbon, or any other suitable medium for transmitting optical signals. The substrate 304 includes signal lines (not shown) connected to pins 314 located along a connector portion 316 of the substrate 304. The number of pins 314 printed on the connector portion 316 can vary depending on the type of DIMM slots mounted on the primary board. For example, the number of pins 314 can be 64, 72, 100, 144, 168, and 184 or more. In general, electronic signals sent to the expansion DIMM 300 over a DDRx interface are processed by the electronic interface (not shown) and sent to the optical interface (not shown) which converts the electronic signals into optical signals that are output over waveguide 310. The optical interface (not shown) converts optical signals received in waveguide 312 into electronic signals that are processed by the electronic interface (not shown) and sent over the DDRx interface to a processor or memory located on a motherboard.

Figure 3B:
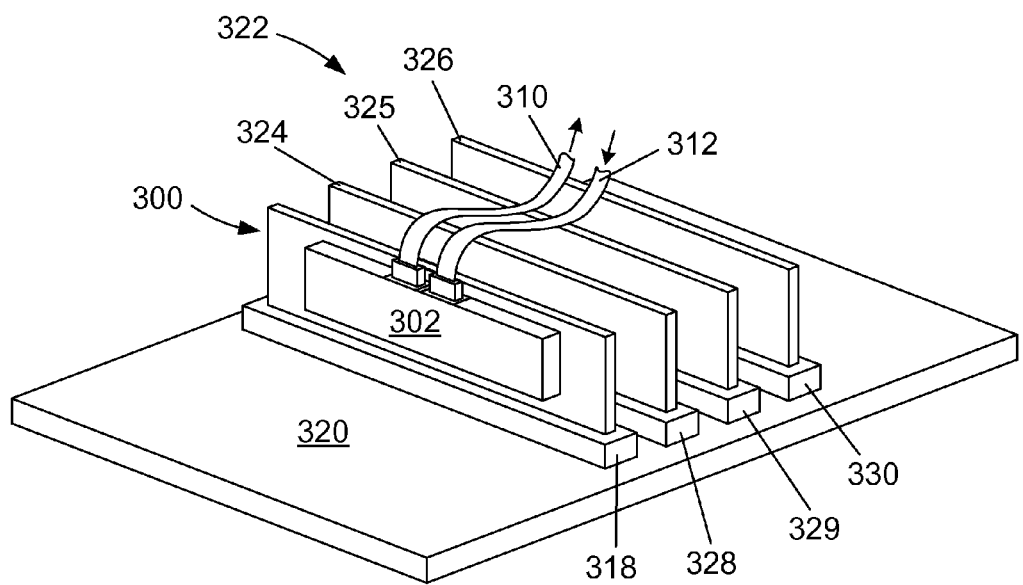
FIG. 3B shows an isometric view of the expansion DIMM loaded into a DIMM slot in accordance with embodiments of the present invention.

FIG. 3B shows an isometric view of the expansion DIMM 300 loaded into a DIMM slot 318 in accordance with embodiments of the present invention. The motherboard 320 can be a motherboard of a memory expansion board, a workstation, a high-end desk top computer, a server blade, or a network interface. The memory 322 disposed on the motherboard 320 comprises three DIMMs 324-326 loaded into DIMM slots 328-330, respectively. The DIMM slot 318 is no different than the DIMM slots 328-330. Thus, the adaptor DIMM 300 can be loaded into any one of the other DIMM slots 328-330 replacing any one of the DIMMs 324-326. The expansion DIMM 300 does not impact the performance of the motherboard 320, and can be loaded into a DIMM slot at the time the motherboard 320 is configured or at some later time when existing memory capacity is insufficient. Although the expansion DIMM 300 can be loaded alongside other DIMMs 324-326, as shown in FIG. 3B, the expansion DIMM 300 may have a relatively reduced maximum data rate as a function of electrical loading when compared to the other DIMMs 324-326.

Figure 4:
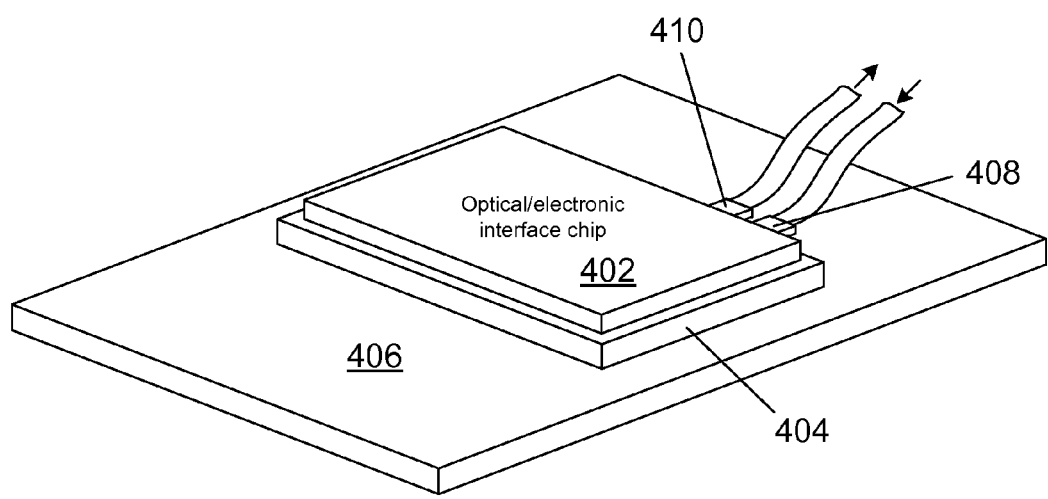
FIG. 4 shows an isometric view of an optical/electronic interface chip inserted into a socket of a motherboard in accordance with embodiments of the present invention.

In other embodiments, the optical/electronic interfaces 202 and 208 can be implemented in a chip inserted into a socket of a motherboard. FIG. 4 shows an isometric view of an optical/electronic interface chip 402 inserted into a socket 404 of a motherboard 406 in accordance with embodiments of the present invention. The chip 402 is configured with an optical interface (not shown) having an optical input port 408 and an optical output port 410, and an electronic interface (not shown) that performs parallel-to-serial and serial-to-parallel flow control of electronic signals encoding data sent to and from the chip 402 over one or more DDRx interfaces, as described below. The optical interface converts electronic signals processed by the chip 402 into optical signals that are output in waveguide 410 and also converts optical signals sent to the chip 402 in waveguide 408 into electronic signals that can be processed by the electronic interface and sent to a processor or other memory located on the motherboard 406.

FIGS. 5-9 show schematic representations of various ways in which the optical/electronic interfaces 300 and 400 can be implement in expansion memory system embodiments of the present invention.

Figure 5:
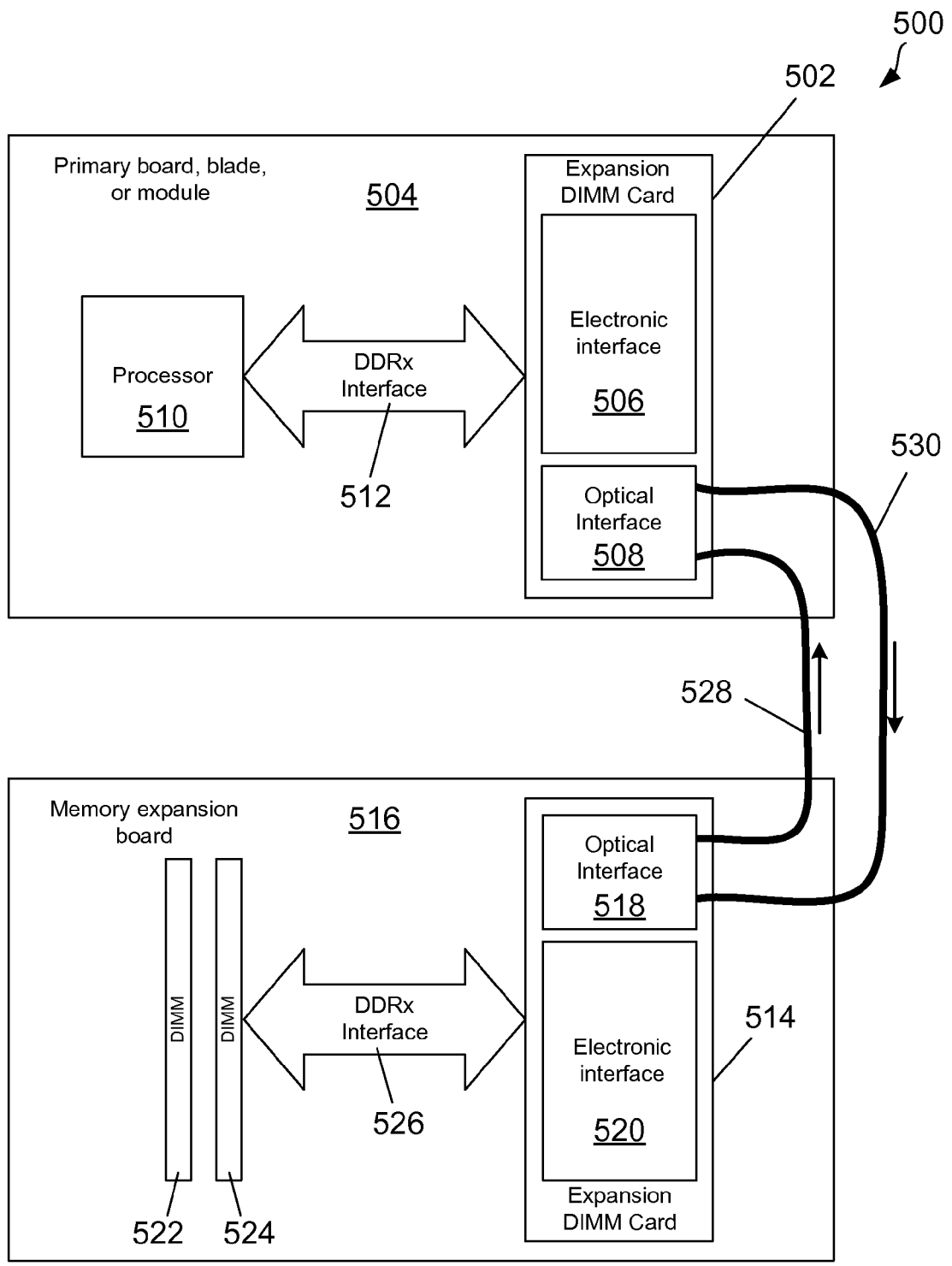
FIG. 5 shows a schematic representation of a first expansion memory system configured in accordance with embodiments of the present invention.

FIG. 5 shows a schematic representation of a first expansion memory system 500 configured in accordance with embodiments of the present invention. The system 500 comprises a first expansion DIMM 502 loaded into a DIMM slot of a primary board 504. The expansion DIMM 502 includes an electronic interface 506 and an optical interface 508. The electronic interface 506 is in electronic communication with a processor 510 via a first DDRx interface 512 and is in electronic communication with the optical interface 508. As shown in FIG. 5, the system 500 includes a second expansion DIMM 514 and a memory expansion board 516. The expansion DIMM 514 is loaded into a DIMM slot of the memory expansion board 516 and includes an optical interface 518 and an electronic interface 520, which is in electronic communication with two DIMMs 522 and 524 via a second DDRx interface 526 and in electronic communication with the optical interface 518. FIG. 5 also shows that the expansion DIMMs 502 and 514 are in optical communication via waveguides 528 and 530 that optically couple interfaces 508 and 518. The system 500 provides a 2:1 expansion for largest memory that can be loaded into DIMM slots of the memory expansion board 516.

When the processor 510 stores data in the DIMMs 522 and 524, the processor 510 sends parallel electronic signals comprising the data, address, and control information to the expansion DIMM 502 over the DDRx interface 512. The electronic interface 506 performs parallel-to-serial flow control by converting the parallel electronic signals into serial electronic signals and includes a memory buffer that stores the information encoded in the electronic signals to compensate for variations in the rate at which data is output from the processor 510. The serial electronic signals are sent to the optical interface 508 and converted into optical signals encoding the same information, which are sent over the waveguide 530 to the optical interface 518 which converts the optical signals back into serial electronic signals that are sent to the second electronic interface 520. The electronic interface 520 performs serial-to-parallel flow control by converting the serial electronic signals into parallel electronic signals and includes a memory buffer to store the information encoded in the electronic signals to compensate for variations in the rate at which data is sent from the expansion DIMM 502. The parallel electronic signals that are sent over the DDRx interface 526 for storage in DIMMs 522 and 524.

Data stored in the DIMMs 522 and 524 is sent to the processor 510 by sending parallel electronic signal over the DDRx interface 526 to the expansion DIMM 514. In this case, the electronic interface 520 performs parallel-to-serial flow control by converting the parallel electronic signals into serial electronic signals and may store the information in the memory buffer to compensate for variations in the rate at which data is sent from the DIMMs 522 and 524. The information is sent from the electronic interface 520 encoded in serial electronic signals to the optical interface 518 and converted into optical signals that are sent over the waveguide 528 to the optical interface 508. The optical interface 508 converts the optical signals back into serial electronic signals that are sent to the first electronic interface 506. The electronic interface 506 performs serial-to-parallel flow control by store the information encoded in the serial electronic signal in the memory buffer to compensate for variations in the rate at which data is sent from the expansion DIMM 514. The electronic interface 506 converts the information into parallel electronic signals that are sent over the first DDRx interface 512 to the processor 510 for processing.

Figure 6:
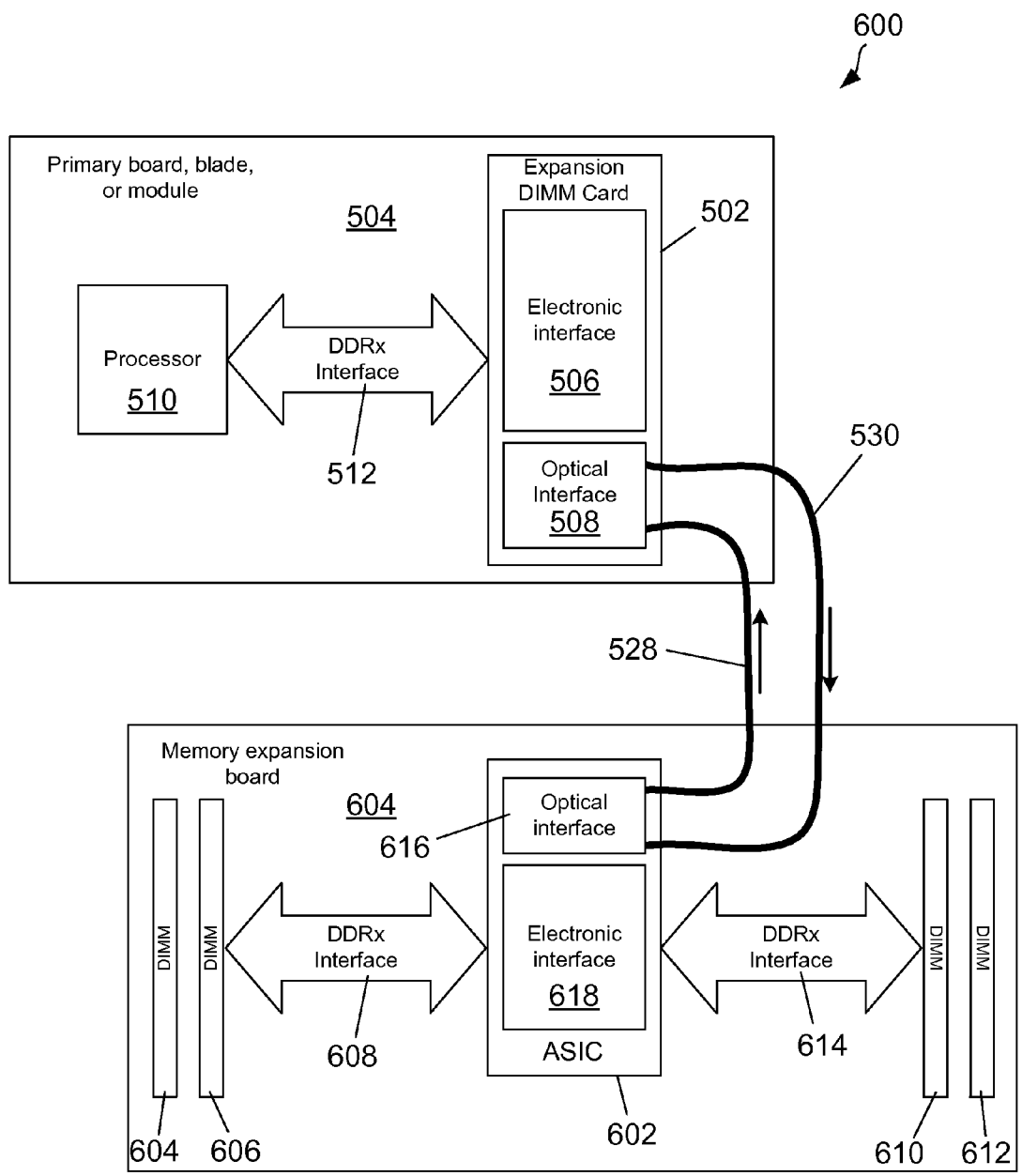
FIG. 6 shows a schematic representation of a second expansion memory system configured in accordance with embodiments of the present invention.

FIG. 6 shows a schematic representation of a second expansion memory system 600 configured in accordance with embodiments of the present invention. The system 600 is nearly identical to the system 500 except the second expansion DIMM 514 is replaced by an application specific integrated circuit ("ASIC") 602 and the memory expansion board 516 is configured differently than the memory expansion board 604. The ASIC 602 is implemented as a board mounted chip, as described above with reference to FIG. 4, and can be configured to fan-out electronic communications with one to more sets of DIMMs. For example, as shown in FIG. 6, the ASIC 602 is configured to fan-out and fan-in electronic communications with two sets of DIMMs. In particular, the ASIC 602 is in electronic communication with DIMMs 604 and 606 over a DDRx interface 608 and in electronic communication with DIMMs 610 and 612 over another DDRx interface 614. ASIC 602 is configured with an optical interface 616 and an electronic interface 618. The optical interfaces 508 and 616 are in optical communication over the waveguides 528 and 530, as described above with reference to FIG. 5, with the optical interface 616 performing the same function as the optical interface 518 of the expansion DIMM 514. The electronic interface 618 also performs the same functions as the electronic interface 520 of the expansion DIMM 514.

Data is sent from the processor 510 of the primary board 504 to memory of the memory expansion board 604 over the waveguide 530 in the same parallel-to-serial flow control manner described above with reference to FIG. 5. The optical interface 616 converts optical signals received from the optical interface 508 back into serial electronic signals and performs substantially the same serial-to-parallel flow control performed by the electronic interface 520 of the expansion DIMM 514 described above with reference to FIG. 5. However, unlike the expansion DIMM 514, the electronic interface 602 converts the information into parallel electronic signals that can be sent over the DDRx interfaces 608 and 614 for storage in DIMMs 604, 606, 610, or 612.

Data stored in the DIMMs 604, 606, 610, or 612 is sent to the processor 510 by sending parallel electronic signal over associated DDRx interfaces 608 and 614 to the ASIC 602. The electronic interface 618 performs substantially the same parallel-to-serial flow control the expansion DIMM 514 performs as described above with reference to FIG. 5. The information is encoded in serial electronic signals and sent from the electronic interface 618 to the optical interface 616 and converted into optical signals that are sent over the waveguide 528 to the optical interface 508. The optical signals are processed as described above with reference to FIG. 5.

Figure 7:
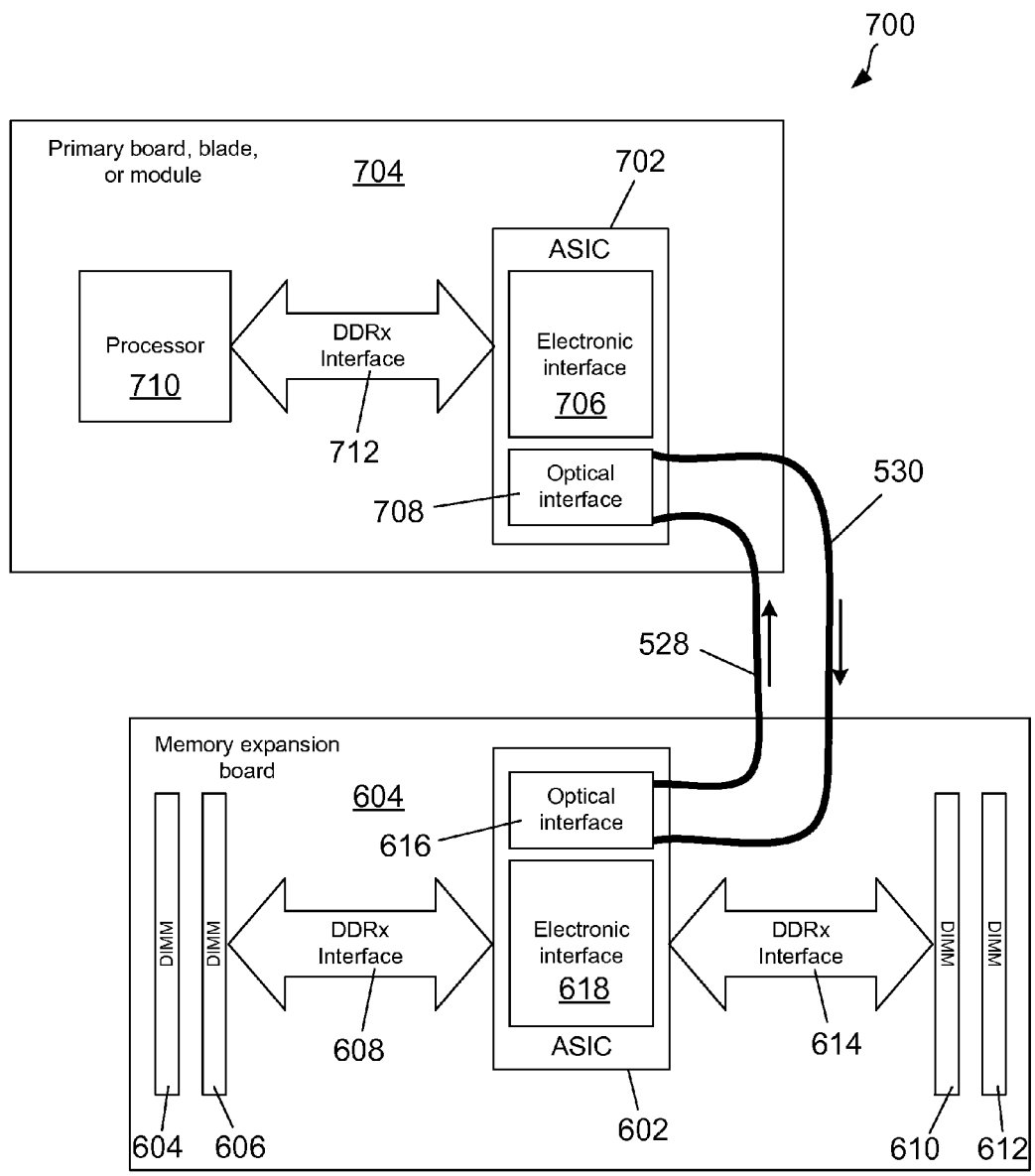
FIG. 7 shows a schematic representation of a third expansion memory system configured in accordance with embodiments of the present invention.

FIG. 7 shows a schematic representation of a third expansion memory system 700 configured in accordance with embodiments of the present invention. The system 700 comprises a first ASIC 702 mounted on a primary board 704. The first ASIC 702 includes an electronic interface 706 and an optical interface 708. The electronic interface 706 is in electronic communication with a processor 710 via a DDRx interface 712 and is in electronic communication with the optical interface 708. As shown in FIG. 7, the system 700 includes a second ASIC 602 and memory expansion board 604 described above with reference to FIG. 6.

Data is sent between the processor 710 between the memory of the memory expansion board 604 over the waveguides 528 and 530 in the same parallel-to-serial and serial-to-parallel flow control manner described above with reference to FIGS. 5 and 6.

Figure 8:
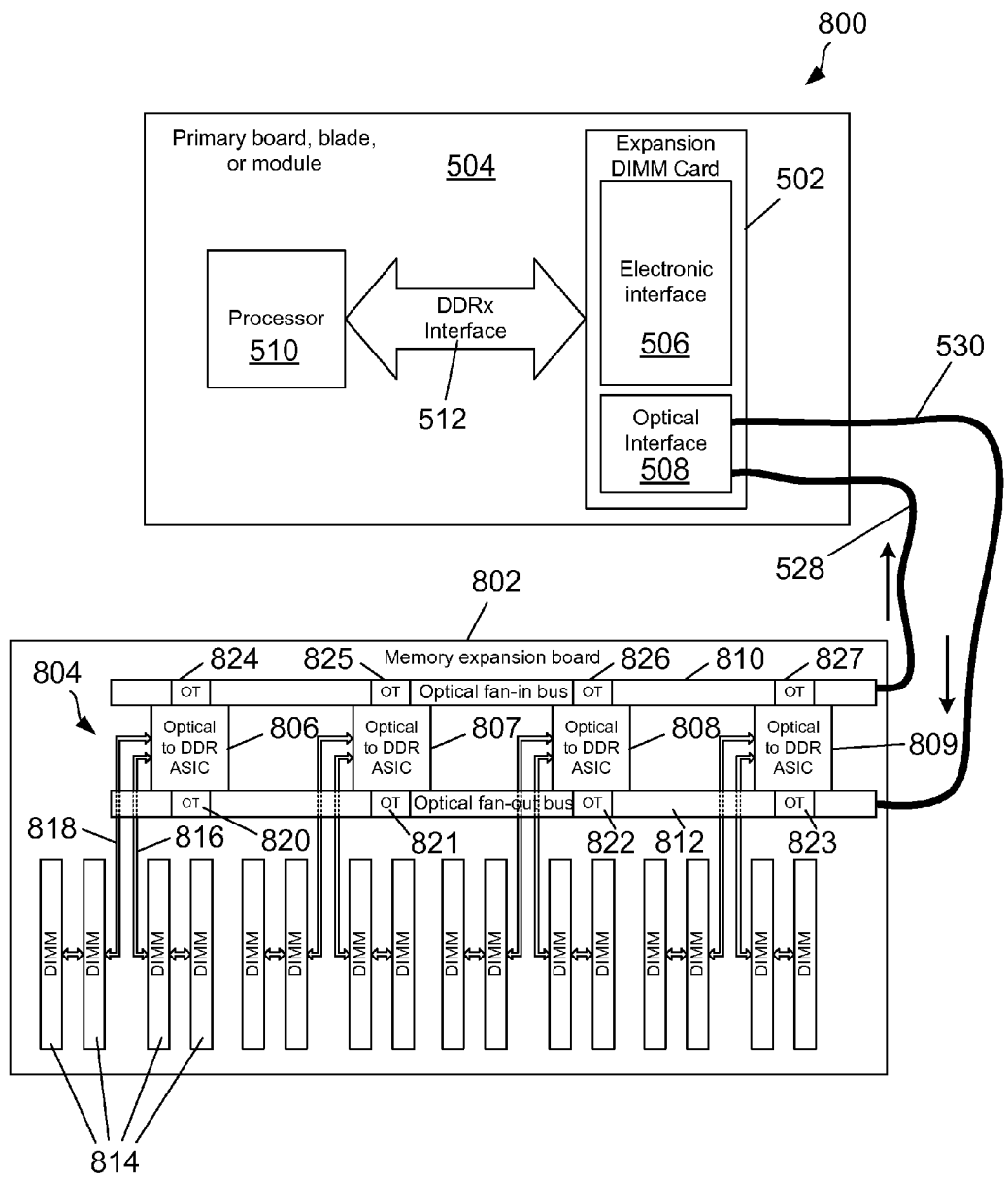
FIG. 8 shows a schematic representation of a fourth expansion memory system configured in accordance with embodiments of the present invention.

FIG. 8 shows a schematic representation of a fourth expansion memory system 800 configured in accordance with embodiments of the present invention. The system 800 comprises the same expansion DIMM 502 loaded into a DIMM slot of the primary board 504 described above with reference to FIG. 5. The system 800 also includes a memory expansion board 802 comprising an optical bus 804 in optical communication with four optical-to-DDR ASICs 806-809. The optical bus 804 comprises a fan-in bus 810 and a fan-out bus 812, both of which are in optical communication with the ASICs 806-809 via optical taps (identified as OT in FIG. 8), such as optical tap 823. The fan-in and fan out buses 810 and 812 can be multi-mode optical fibers, ridge waveguides, photonic crystal waveguides, hollow waveguides or any other suitable multi-mode medium for transmitting optical signals. The hollow waveguides can be composed of a tube with an air core. The structural tube forming the hollow waveguide can have inner core materials with refractive indices greater than or less than one. The tubing can be composed of a suitable metal, glass, or plastic and metallic and dielectric films can be deposited on the inner surface of the tubing providing for a high reflectance. The hollow waveguides can be hollow metal waveguides with high reflective metal coatings lining the interior surface of the core. The air core can have a cross-sectional shape that is circular, elliptical, square, rectangular, or any other shape that is suitable for guiding light. Because the waveguide is hollow, optical signals can travel along the core of a hollow waveguide with an effective index of about 1. In other words, light propagates along the core of a hollow waveguide at the speed of light in air or vacuum. The optical taps can be beam splitters, partially reflective mirrors, or any other medium that can be configured to reflect and transmit particular portions of the optical signals transmitted along the buses 810 and 812. Each of the optical-to-DDR ASICs is in electronic communication with four associated DIMMs over DDRx interfaces. For example, the ASIC 806 is in electronic communication with DIMMs 814 via DDRx interfaces 816 and 818.

Optical taps 820-823 of the fan-out bus 812 are configured to distribute the optical power approximately equally among the ASICs 806-809. In general, the optical taps are configured to divert about 1/nth of the total optical power of an optical signal output from the optical interface 508 to each of the optical-to-DDR ASICs, where n is the number of optical-to-DDR ASICs. For example, the optical tap 823 diverts about ¼ of the optical power carried by the optical bus 812 to the ASIC 809, optical tap 822 directs about ⅓ of the optical power carried by the optical bus 812 to the ASIC 808, optical tap 821 directs about ½ of the remaining optical power carried by the optical bus 812 to the ASIC 807, and optical tap 820 is a fully reflective mirror. On the other hand, optical taps 824-827 of the fan-in bus 810 are configured so that an equal amount of optical power is received by the optical interface 508 from each of the ASICs 806-809. In general, the n optical taps of a fan-in bus are configured so that an optical interface receives about 1/nth of the total optical power output from each of n optical-to-DDR ASICs. For example, the optical taps 824-827 are all configured so that the optical power of the optical signal received by the optical interface 508 is approximately ¼ of the power of the optical signal output from each of the ASICs 806-809.

The memory expansion board 802 can include a repeater (not shown) in optical communication with fan-in and fan-out waveguides 810 and 812. The repeater is an optical-to-electrical-to-optical converter that receives optical signals, regenerates the optical signals, and then retransmits the regenerated optical signals. The repeater can be used to overcome attenuation caused by free-space or optical interconnect loss. In addition to strengthening the optical signals, the repeater can also be used to remove noise or other unwanted aspects of the optical signals. The amount of optical power produced by the repeater is determined by the number of ASICs attached to the fan-out bus, the system loss and the optical receiver sensitivity at the ASICSs. In other words, the repeater can be used to generate optical signal with enough optical power to reach all of the ASICs.

Data sent from the processor 510 includes the additional address of the optical-to-DDR ASIC responsible for storing the data. The data is generated and sent from the processor to the fan-out bus 812 is the same parallel-to-serial flow control manner described above with reference to FIG. 5. The optical signals are injected directly into the fan-out bus 812 and the optical taps 820-823 directs a portion of the optical signal to the associated ASICs 806-809, which are configured and operated to perform the same serial-to-parallel flow control described above with reference to the ASIC 602 in FIG. 6, except the ASICs 806-809 perform an additional step of analyzing the address portion of the electronic signal identifying the ASIC destined to receive the data. When the address does not correspond to the address of the receiving ASIC, the data may be discarded. However, when the address matches the address of the receiving ASIC, the ASIC processes the data by storing the data is associated DIMMs.

In order to send data stored in the DIMMs of the memory expansion board 802, an arbiter can be used to prevent two or more ASICs from simultaneously using the fan-in bus 810. Without arbitration, the optical interface 508 could receive optical signals from more that one ASIC on the waveguide 528, where the optical signals combine and arrive indecipherable at the optical interface 508. An arbiter ensures that before the fan-in bus 810 can be used, an ASIC has been granted permission to use the fan-in bus 810 to prevent simultaneous optical signal transmissions. The arbitration is relatively fast and scales as the number of ASICs are added to the fan-in bus 810. Arbitration can be carried out by an arbiter using well-known optical or electronic, token-based arbitration methods. Once one of the ASICs 806-809 has been granted permission to use the fan-in bus 810, an optical signal generating data stored in the associated DIMMs is generated, as described above with reference to FIG. 6, and sent to the optical interface 508 over the fan-in bus 810 and the waveguide 528. The data is received by the processor 510 as described above with reference to FIG. 5.

Figure 9:
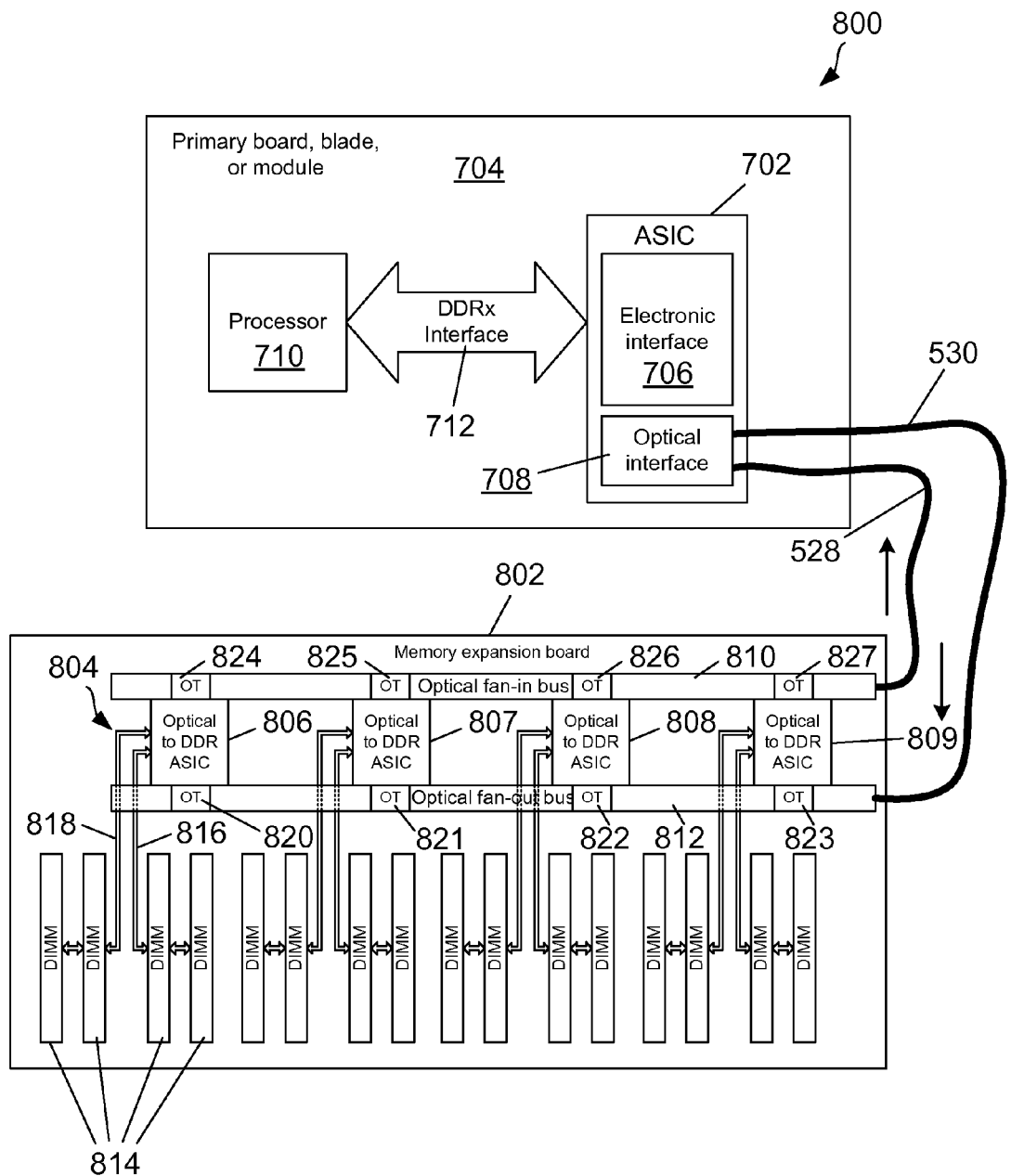
FIG. 9 shows a schematic representation of a fifth expansion memory system configured in accordance with embodiments of the present invention.

FIG. 9 shows a schematic representation of a fifth expansion memory system 900 configured in accordance with embodiments of the present invention. The system 900 comprises the same ASIC 702 of the primary board 704 described above with reference to FIG. 7, and the system 900 includes the same memory expansion board 802 configured as described above with reference to FIG. 8. The ASIC 702 and the primary board 704 are operated as described above with reference to FIG. 7, and the components of the memory expansion board 802 are configured and operated as described above with reference to FIG. 8.

Figure 10:
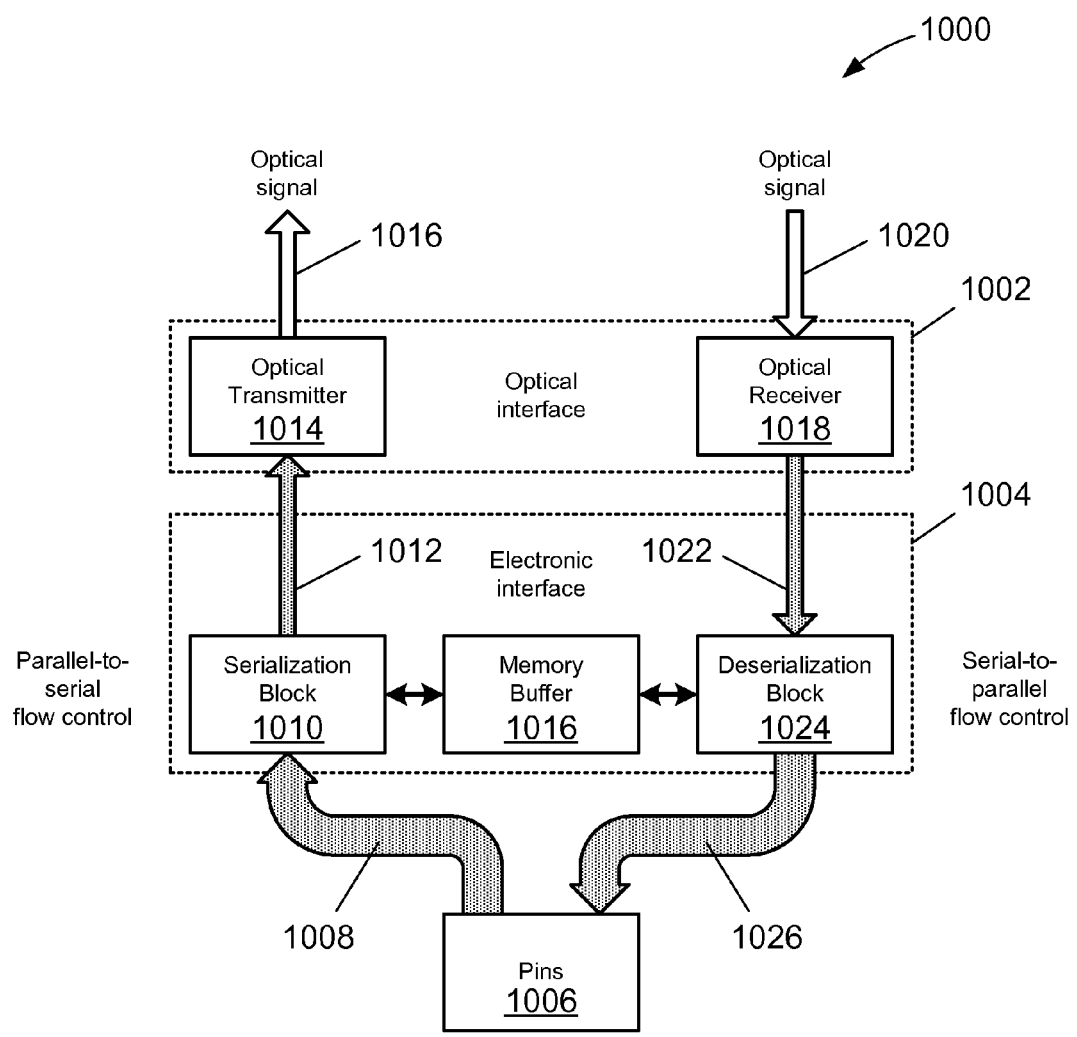
FIG. 10 shows a block diagram of an optical/electronic interface configured in accordance with embodiments of the present invention.

FIG. 10 shows a block diagram of an optical/electronic interface 1000 configured in accordance with embodiments of the present invention. The interface 1000 includes an optical interface 1002, an electronic interface 1004, and pins 1006. The pins 1006 are electronically connected to one or more DDRx interfaces of a motherboard via a DIMM slot or socket as described above with reference to FIGS. 3 and 4.

The pins 1006 receive parallel electronic signals 1008 encoding data, address, and control information from the parallel signal lines of the one or more DDRx interfaces and send the parallel electronic signals 1008 to a serialization block 1010 of the electronic interface 1004. The serialization block 1008 comprises electronic components that receive and convert the parallel electronic signals 1008 into serial electronic signals 1012 encoding the same information. The serialization block 1010 may optionally employ DC balanced coding to the serial electronic signal 1012. DC balanced coding is used to generate code words with an equal number of logic "1"s and logic "0"s. Examples of DC balanced coding include Manchester coding and its variations. In Manchester coding, a logic "0" is identified by a "0" to "1" transition at the center of a bit and a logic "1" is indicated by a "1" to "0" transition at the center of a bit. In 4B/6B DC balanced coding, the code words include three logic "1"s and three logic "0"s to provide DC balance. In 4B/8B DC balanced coding, eight bit code words have four logic "1"s and four logic "0"s with no more than two consecutive logic "1"s and logic "0"s. In 8B/10B DC balanced coding, 8 bits of data are transmitted as a 10-bit entity called a symbol or character. The low 5 bits of data are encoded into a 6-bit group (the 5B/6B portion) and the top 3 bits are encoded into a 4-bit group (the 3B/4B portion). These code groups are concatenated together to form a 10-bit symbol. The two additional bits allow the number of "0" and "1" bits sent in a data stream over time to be balanced. Prior to sending the serial electronic signals 1012 to an optical transmitter 1014 of the optical interface 1002, the information may be temporarily stored in a memory buffer 1016 to compensate for variations in the rate at which data is received and the rate at which it can be sent. The optical transmitter 1014 converts the serial electronic signals 1012 into optical signals 1016 encoding the same information, which are transmitted over an output waveguide, such as waveguides 310 and 410 described above. The optical transmitter 1014 can be a vertical cavity surface emitting laser ("VCSEL"), a double heterostructure laser, a quantum well laser, a quantum cascade laser, a distributed feedback laser, or any other semiconductor-based laser.

As shown in FIG. 10, the optical interface 1002 also includes an optical receiver 1018 for receiving optical signals 1020 encoding information. The optical receiver 1018 can be a pn or p-i-n junction photodiode that converts the optical signals 1020 into serial electronic signals 1022 encoding the same information. For example, the optical receiver 1018 can be a gallium arsenide ("GaAs"), indium gallium arsenide ("InGaAs"), silicon ("Si"), a germanium ("Ge"), or a SiGe-based photodiode integrated on a chip. The electronic interface 1004 includes a deserialization block 1024 comprising electronic components that receive the serial electronic signals 1022, decodes the DC balanced coding in the serial electronic signals 1022, and converts the serial electronic signals 1022 into parallel electronic signals 1026 that are transmitted to the pins 1006 for transmission over the DDRx interface. The information may also be stored temporarily in the memory buffer 1016 prior to generating the parallel electronic signals 1026.

Figure 11:
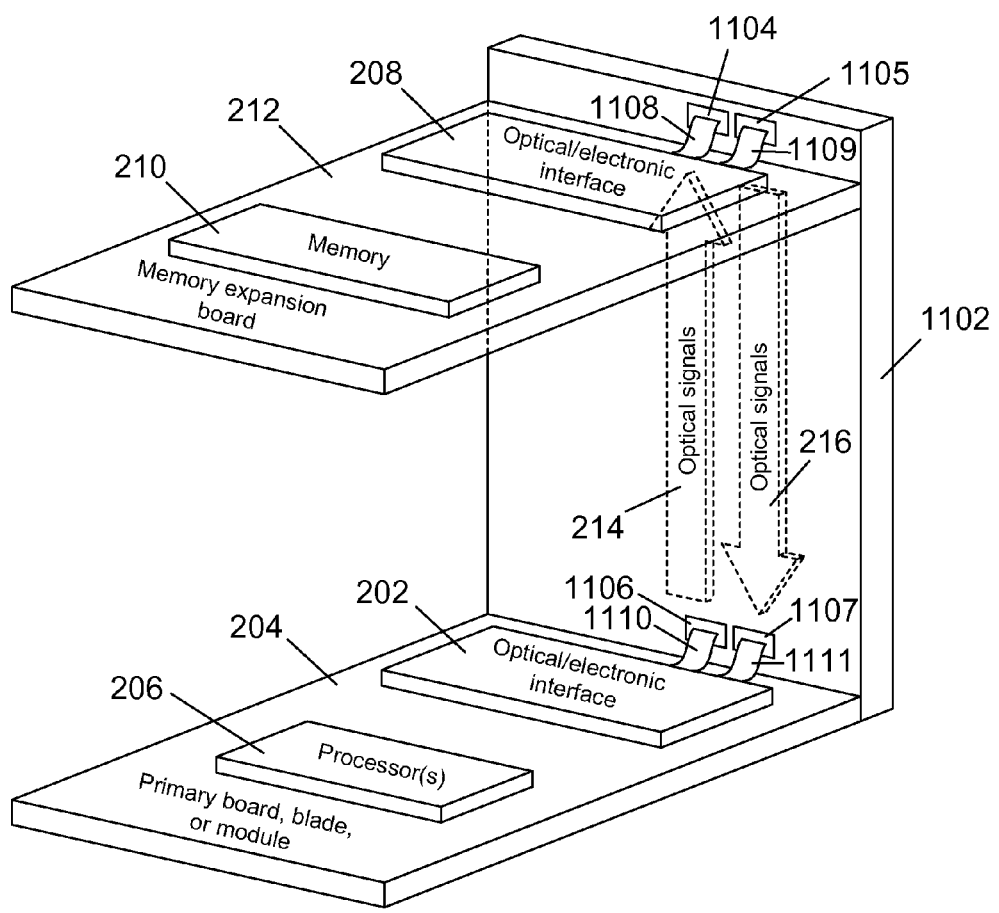
FIG. 11 shows an isometric view and schematic representation of a primary board and a memory expansion board in optical communication via a backplane in accordance with embodiments of the presenting invention.

The waveguides 528 and 530 are merely representative one of numerous ways in which a memory expansion board can be optically connected to a primary board. For example, a memory expansion board and a primary board can be optically interconnected through a cabinet backplane that is also used to provide electronic and optical connections between other boards mounted in the same cabinet. FIG. 11 shows an isometric view and schematic representation of the primary board 204 and the memory expansion board 212 in optical communication via a cabinet backplane 1102. Other boards and portions of the cabinet are not shown for clarity of illustration. The backplane 1102 may includes fiber ribbon connectors 1104-1107. As shown in FIG. 11, optical/electronic interface 208 is optically coupled to the connectors 1104 and 1105 via fiber ribbons 1108 and 1109, and optical/electronic interface 202 is optically coupled to the connectors 1106 and 1107 via fibber ribbons 1110 and 1111. The backplane 1102 is configured with optical fibers that optically connect the connectors 1104 and 1106 and optical connect the connectors 1105 and 1107 enabling the optical/electronic interfaces 202 and 208 to exchange optical signals 214 and 216 as described above.

Note that the DDRx and electronic interfaces used to transmit, serialize, and deserialize electronic signals are performed at relatively lower data transmission rates than the rate at which the optical signals are transmitted between the optical interfaces. For example, the optical signals transmitted over the waveguides 528 and 530 or the backplane 1102 may be transmitted at approximately 4 to 6 times the clock rate. In other words, high speed data transmissions are accomplished between the optical interfaces, and relatively slower speed transmissions are carried out with the electronic components, such as the DDRx and electronic interfaces.

Figures 12, 13:
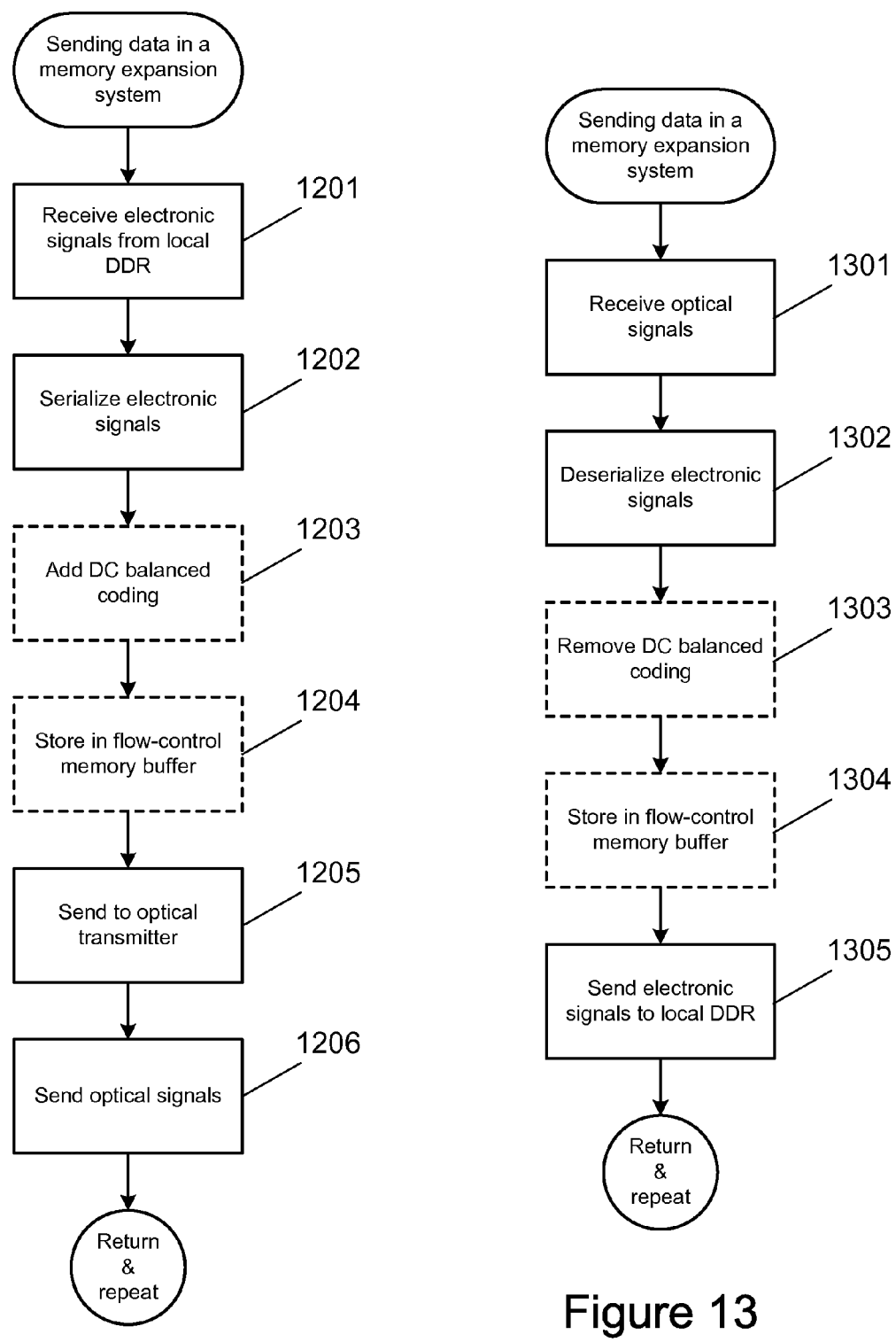
FIG. 12 shows a control-flow diagram of a method for sending data in an expansion memory system in accordance with embodiments of the present invention.
FIG. 13 shows a control-flow diagram of a method for receiving data in an expansion memory system in accordance with embodiments of the present invention.

FIG. 12 shows a control-flow diagram of a method for sending data in an expansion memory system in accordance with embodiments of the present invention. In step 1201, parallel electronic signals are received from a DDRx interface, as described above with reference to FIGS. 5-10. The parallel electronic signals can be generated by a processor or local memory. In step 1202, the parallel electronic signals are serialized by converting the parallel electronic signals into serial electronic signals encoded the same information, as described above with reference to the serialization block 1010 of FIG. 10 and with reference to FIGS. 5-9. In optional step 1203, the serial electronic signals can be encoded to include DC balance, as described above with reference to the serialization block 1010 in FIG. 10. In optional step 1204, in order to compensate for variations in the rate at which data is received and/or sent, the information encoded in the electronic signals can be stored in a memory buffer, as described above with reference to step 1014 of FIG. 10. In step 1205, serial electronic signals encoding the data are sent to an optical transmitter, as described above with reference to FIG. 10. In step 1206, the optical transmitter converts the serial electronic signals into optical signals that are sent over waveguides to an optical/electronic interface of a primary board or a expansion memory system.

FIG. 13 shows a control-flow diagram of a method for receiving data in an expansion memory system in accordance with embodiments of the present invention. In step 1301, optical signals sent from a primary board or a memory expansion board are received and converted into serial electronic signals, as described above with reference to the optical signals 1024 in FIG. 10. In step 1302, the serial electronic signals are converted in parallel electronic signals using a deserialization block, as described above with reference to deserialization block 1028 in FIG. 10. In optional step 1303, when optical signals are sent using DC balanced coding, as described above with reference to FIG. 10, DC balanced coding is removed from the parallel electronic signals. In optional step 1304, the parallel electronic signals can be stored in a memory buffer to compensate for variations in the rate at which data is received and the rate at which it can be sent. In step 1305, parallel electronic signals encoding the data are transmitted over a DDRx interface to a processor of a primary board or to memory of a memory expansion board.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. An expansion memory system comprising:
a first optical/electronic interface in electrical communication with a processor, the first optical/electronic interface configured to receive and convert optical signals into electronic signals that are sent to the processor and receive and convert electronic signals produced by the processor into optical signals;
a memory expansion board comprising memory, an optical fan-in bus and an optical fan-out bus; and
a second optical/electronic interface attached to the memory expansion board, the second optical/electronic interface configured to receive and convert optical signals into electronic signals that are sent to the memory and receive and convert electronic signals corresponding to information stored in the memory into optical signals, wherein the optical signals produced by the first optical/electronic interface are sent to the second optical/electronic interface via the optical fan-in bus and the optical signal produced by the second optical/electronic interface are sent to the first optical/electronic interface via the optical fan-out bus.

2. The system of claim 1 wherein the first optical/electronic interface further comprises an expansion dual in-line memory module.

3. The system of claim 1 wherein the first optical/electronic interface further comprises an application specific integrated circuit.

4. The system of claim 1 wherein the second optical/electronic interface further comprises an expansion dual in-line memory module.

5. The system of claim 1 wherein the second optical/electronic interface further comprises an application specific integrated circuit.

6. The system of claim 1 wherein the first and second optical/electronic interfaces further comprise:
an optical interface; and
an electronic interface.

7. The system of claim 6 wherein the optical interface further comprises
an optical transmitter configured to receive and convert electronic signals into optical signals; and
an optical receiver configured to receive and convert optical signals into 8. The system of claim 1 wherein the optical/electronic interface sends and receives electronic signals in parallel over a double data rate interface.

9. The system of claim 1 wherein memory of the memory expansion board further comprises one or more dual in-line memory modules.

10. The system of claim 1, wherein the memory expansion board further comprises a repeater in optical communication with the optical fan-in bus and the optical fan-out bus, wherein the repeater is an optical-to-electrical-to-optical converter arranged to receive optical signals, regenerate the optical signals and re-transmit the regenerated optical signals.

11. The system of claim 1, wherein the second optical/electronic interface is a first of a plurality of optical/electronic interfaces in communication with the optical fan-in and the fan-out bus, each of the plurality of optical/electronic interfaces are configured to receive and convert the optical signals into the electronic signals that are sent to the memory and convert the electronic signals corresponding to the information stored in the memory into the optical signals.

12. The system of claim 11, wherein the optical fan-in bus comprises an optical tap for each of the plurality of optical/electronic interfaces, each optical tap is configured to divert approximately 1/nth of total optical power of a received optical signal to a respective optical/electronic interface, wherein n is a total number of the plurality of optical electronic interfaces.

13. An expansion memory system comprising:
a first optical/electronic interface in electrical communication with a processor, the first optical/electronic interface configured to receive and convert optical signals into electronic signals that are sent to the processor and receive and convert electronic signals produced by the processor into optical signals;
a memory expansion board configured with memory; and
a second optical/electronic interface attached to the memory expansion board, the second optical/electronic interface configured to receive and convert optical signals into electronic signals that are sent to the memory and receive and convert electronic signals corresponding to information stored in the memory into optical signals, wherein the optical signals produced by the first optical/electronic interface are sent to the second optical/electronic interface and the optical signal produced by the second optical/electronic interface are sent to the first optical/electronic interface, wherein the first and second optical/electronic interface further comprises:
an optical interface;
an electronic interface;
a memory buffer;
a serialization block configured to convert parallel electronic signals for transmission over a double data rate interface into serial electronic signals; and
a deserialization block configured to convert serial electronic signals into parallel electronic signals for transmission over a double data rate interface.

14. A method for sending data in an expansion memory system comprising:
serializing parallel electronic signals received over a double data rate interface into serial electronic signals encoding the same information;
storing the information encoded in the electronic signals in a memory buffer;
converting the serial electronic signals into optical signals using an optical transmitter, the optical signals encoding the same information; and
transmitting, by a first optical/electronic interface, the optical signals to a second optical/electronic interface, wherein the first and the second optical/electronic interface are in optical communication with an optical fan-in bus.

15. The method of claim 14 further comprising adding DC balanced coding to the serial electronic signals.

16. A method for receiving data in an expansion memory system comprising:
- receiving, by a first optical/electronic interface, optical signals transmitted from a second optical/electronic interface, wherein the first and the second optical/electronic interface are in optical communication with an optical fan-in bus;
- converting the received optical signals into serial electronic signals using an optical receiver;
- deserializing the serial electronic signals into parallel electronic signals using a deserialization block;
- storing information encoded in the electronic signal in a memory buffer; and
- transmitting the parallel electronic signals over a double data rate interface.

17. The method of claim 16 further comprising removing DC balanced coding from the serial electronic signals.

\* \* \* \* \*